Feb. 15, 1927.  
F. J. WERNETH  
LUGGAGE CARRIER FOR AUTOMOBILES  
Filed Sept. 9, 1926  
1,617,828
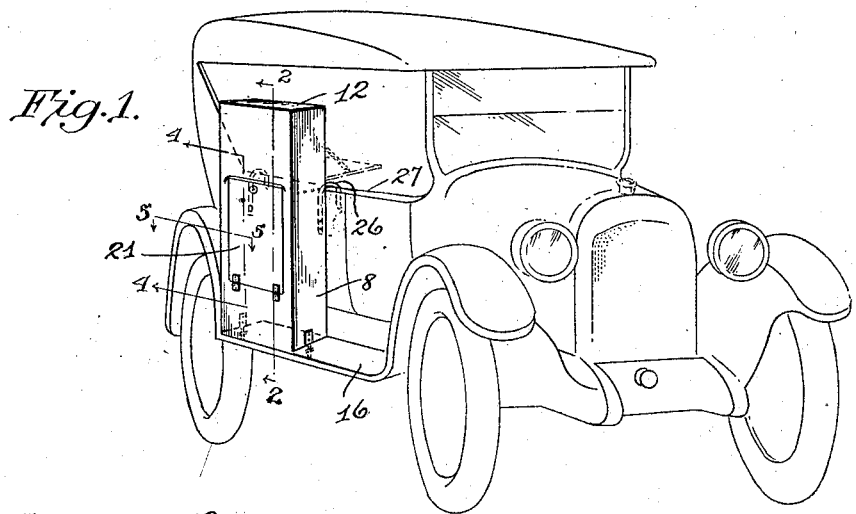
Fig. 1.
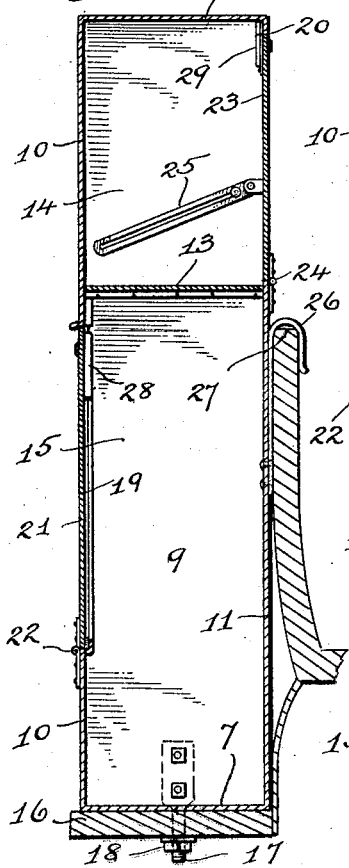
Fig. 2.
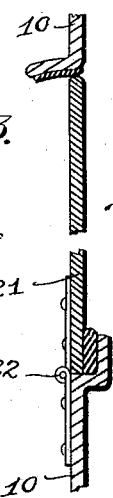
Fig. 3.
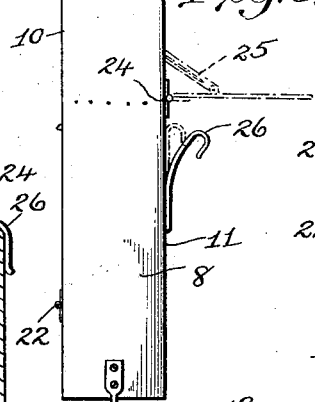
Fig. 4.
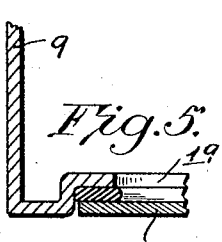
Fig. 5.
Fig. 6.
Inventor  
Francis J. Werneth  
By Charles B. Mann Jr.  
Attorney.

Patented Feb. 15, 1927.

1,617,828

UNITED STATES PATENT OFFICE.

FRANCIS J. WERNETH, OF TOWSON, MARYLAND.

LUGGAGE CARRIER FOR AUTOMOBILES.

Application filed September 9, 1926. Serial No. 134,376.

This invention relates to improvements in luggage carriers and has particular reference to a carrier that is especially designed for attachment to an automobile.

One object of the invention is to provide a carrier of novel construction that may readily be attached to an automobile and which is so designed that compartments in the carrier may be accessible from the outer side or from the inner side by a person riding in the car.

Another object of the invention is to provide a novel construction of luggage carrier for attachment to an automobile in which a compartment of the carrier will be accessible to persons riding in the car and which compartment will be provided with a cover that may be turned down on the inside of the car and form a convenient shelf or table at the carrier-opening.

With these, and other objects in view, the invention is illustrated in the accompanying drawing, wherein,—

Fig. 1 shows an automobile in outline to which the improved luggage carrier is attached.

Fig. 2 illustrates, on an enlarged scale, a vertical sectional detail through the device as the same would appear if viewed on the line 2—2 of Fig. 1.

Fig. 3 shows a side view of the carrier.

Fig. 4 illustrates an enlarged vertical sectional detail through the outer door portion of the carrier,—the section being taken on the line 4—4 of Fig. 1.

Fig. 5 shows a horizontal sectional detail through the door and wall of the carrier as the same would appear if viewed on the line 5—5 of Fig. 1 and Fig. 6 illustrates a vertical sectional detail through the upper compartment of the carrier looking toward the inner side of the door thereof.

Referring to the drawing, the numeral 7 designates the bottom of the case or carrier, which latter also has side walls 8 and 9 and front and rear walls 10 and 11 respectively.

The carrier also has a top wall 12, which is rigid with respect to the side walls and also with respect to the front wall.

In the present instance, the interior of the carrier is provided with a horizontal partition 13, which extends between the front and rear walls and which divides the carrier into an upper compartment 14, and a lower compartment 15.

The carrier is especially designed to be seated upon the running-board 16 of an automobile and to this end suitable bolts 17 are provided on the opposite side walls 8 and 9, which bolts extend through the running-board and are engaged by nuts 18 on the under side of the latter, as seen in Fig. 2 of the drawing.

The carrier is provided with an opening 19 in its front vertical wall 10, below the horizontal partition 13, and has another opening 20, in its rear vertical wall 11 above the said partition 13. This arrangement of openings with respect to the partition provides a front opening below the partition and a rear opening above the partition.

A lower and outside door 21, is hinged at 22 to swing outwardly and down from the lower edge of the lower front opening 19 while an upper and inner door 23, has its lower edge hinged at 24 so as to swing inwardly and down from the lower edge of the upper rear opening 20.

The upper door 23 forms a horizontal shelf when it is swung down,—being held in the horizontal position by means of suitable sliding and slotted bars 25 as shown in Figs. 2 and 3 of the drawing.

On the rear vertical wall 11 of the carrier, I provide a plurality of flexible hooks 26 which latter are located just below the hinge 24 of the upper rear door. These hooks are positioned so as to project over and engage the side edge 27 of the vehicle body or suitable fastenings that may be provided on said body in case the carrier is attached to a closed car type of automobile.

Suitable locks 28 and 29 are provided on the doors 21 and 23 for the obvious purpose of locking said doors in the closed positions.

While the two compartments 14 and 15 may be utilized for the storage of any articles desired, I have especially designed the carrier so that the upper compartment 14 may be utilized for carrying a radio apparatus while the inwardly-swinging door 23 will form a shelf or table during the use of such apparatus.

Having described my invention, I claim,—

1. In a carrier for automobiles the combination with a case having front and rear vertical walls and a fixed top the front wall having a lower front opening with a door therefor that swings outwardly and the rear wall also having an upper opening with a door for the same that swings inwardly toward the automobile body and means for attaching the case to an automobile.

2. In a carrier of the class described the combination with a case having front, rear, side and top walls, of a horizontal partition in the case between the front and rear walls,—the front wall having an opening therein below said partition and the rear wall having an opening above said partition, a door swinging outwardly from the opening below the partition and a door swinging in a reverse direction from the opening above the partition.

3. In a carrier of the class described the combination with a case having vertical front, rear and side walls with a horizontal top and bottom,—said case being provided with a horizontal partition and having an opening in the front wall below the partition and another opening in the rear wall above the said partition, means for closing said lower opening, means below the rear opening for securing the case to an automobile and a door at the said upper opening and having means to support it in a horizontal position in front of said rear upper opening when the door is opened.

In testimony whereof I affix my signature.

FRANCIS J. WERNETH.